United States Patent
Adhikari et al.

(10) Patent No.: US 8,054,969 B2
(45) Date of Patent: Nov. 8, 2011

(54) TRANSMISSION OF A DIGITAL MESSAGE INTERSPERSED THROUGHOUT A COMPRESSED INFORMATION SIGNAL

(75) Inventors: Akshay Adhikari, Basking Ridge, NJ (US); Sachin Garg, Green Brook, NJ (US); Anjur Sundaresan Krishnakumar, Rocky Hill, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 490 days.

(21) Appl. No.: 11/675,345

(22) Filed: Feb. 15, 2007

(65) Prior Publication Data

US 2008/0198045 A1 Aug. 21, 2008

(51) Int. Cl.
*H04N 7/167* (2011.01)
(52) U.S. Cl. .................. 380/205; 713/181; 704/201
(58) Field of Classification Search .............. 380/28, 380/37, 205; 704/200; 713/176
See application file for complete search history.

(56) References Cited

U.S. PATENT DOCUMENTS

| | | | |
|---|---|---|---|
| 6,122,271 | A | 9/2000 | McDonald et al. |
| 6,671,518 | B2 | 12/2003 | Harris et al. |
| 6,792,542 | B1 | 9/2004 | Le et al. |
| 6,907,045 | B1 | 6/2005 | Robinson et al. |
| 7,330,812 | B2 * | 2/2008 | Ding ............... 704/200.1 |
| 2003/0097596 | A1 * | 5/2003 | Muratov et al. ........ 713/202 |
| 2003/0154073 | A1 * | 8/2003 | Ota et al. .............. 704/207 |
| 2004/0068399 | A1 | 4/2004 | Ding |
| 2006/0156009 | A1 | 7/2006 | Shin et al. |
| 2006/0247926 | A1 | 11/2006 | Rousseau |

FOREIGN PATENT DOCUMENTS

| | | |
|---|---|---|
| CA | 2444151 A1 | 4/2004 |
| JP | 2002515678 T | 5/2002 |
| JP | 2006139306 A | 6/2006 |
| KR | 20050028193 A | 3/2005 |
| KR | 1020070004248 A | 9/2007 |
| WO | 9518523 A | 7/1995 |
| WO | WO 2006023839 A2 * | 3/2006 |

(Continued)

OTHER PUBLICATIONS

International Telecommunication Union, "Coding of Speech at 8 kbits/s Using Conjugate-Structure Algebraic-Code Excited Linear-Prediction (CS-ACELP)," ITU-T Recommendation G.729, Mar. 1996.*

(Continued)

*Primary Examiner* — Ashok Patel
*Assistant Examiner* — Brian Shaw
(74) *Attorney, Agent, or Firm* — Maldjian Law Group LLC; John P. Maldjian, Esq.

(57) ABSTRACT

A method is disclosed that enables the transmission of a digital message along with a corresponding media information signal, such as audio or video. A telecommunications device that is processing the information signal from its user, such as a speech signal, encodes the information signal by using a model-based compression coder. One such device is a telecommunications endpoint. Then, based on an evaluation of the perceptual significance of each encoded bit, or on some other meaningful characteristic of the signal, the endpoint's processor: (i) determines which encoded bits can be overwritten; and (ii) intersperses the digital message bits throughout the encoded signal in place of the overwritten bits. The endpoint then transmits those digital message bits as part of the encoded information signal. In this way, no additional bits are appended to the packet to be transmitted, thereby addressing the issue of compatibility with existing protocols and firewalls.

18 Claims, 5 Drawing Sheets

FOREIGN PATENT DOCUMENTS

WO    2006076187 A2    7/2006

OTHER PUBLICATIONS

Stallings, W. (1995). Network and internetwork security: principles and practice. Prentice Hall, New Jersey, pp. 166-171.*

Fridrich, J. et. al. (2002). Lossless data embedding for all image formats. Security and Watermarking of Multimedia Contents, San Jose, California, Jan. 2002, SPIE Photonics West, Electronic Imaging.*

Christian Geibler, "EP Application No. 08 00 2076 Office Action", Jun. 11, 2008, Published in: EP.

"KR Application No. 2008-0013605 Office Action Oct. 14, 2009", , Publisher: KIPO, Published in: KR.

"EP Application No. 08 002 076.1 Office Action Jan. 12, 2010", , Publisher: EPO, Published in: EP.

Liu, Dongsheng, "CN Application No. 200810005647.8 Office Action Aug. 11, 2010", , Publisher: SIPO, Published in: CN.

Hatada et al., "A Study of Electronic Watermarking Based on Process of Speech Production Using G.729 Parameter", "Collection of Lecture Papers in General Meeting of Electronic Information Communication Society", Mar. 3, 2003, p. 191.

Yamashita, T., "JP Application No. 2008-034175 Office Action Sep. 27, 2010", , Publisher: JPO, Published in: JP.

Sakai et al., "Digital Watermarking Based on Process of Speech Production", "Security, Steganography, and Watermarking of Multimedia Contents VI", 2004, pp. 127-138, vol. 5306, Publisher: Proceedings of SPIE-IS&T Electronic Imaging.

Reynolds, Ryan, "CA Application No. 2,619,796 Office Action Jan. 28, 2011", , Publisher: CIPO, Published in: CA.

Reynolds, Ryan, "CA Application No. 2,619,796 Office Action Mar. 23, 2010", , Publisher: CIPO, Published in: CA.

Shaw, Brian F., "U.S. Appl. No. 11/675,352 Office Action Mar. 16, 2011" , , Publisher: USPTO, Published in: US.

Shaw, Brian, "U.S. Appl. No. 11/675,352 Panel Decision May 18, 2011", , Publisher: USPTO, Published in: US.

Geissler, Christian, "EP Application No. 08 002 076.1 Office Action Apr. 21, 2011", , Publisher: EPO, Published in: EP.

Tabei, K., "JP Application No. 2008-034175 Office Action May 11, 2011", , Publisher: JPO, Published in: JP.

* cited by examiner

Endpoint 102-m

Figure 5

TRANSMISSION OF A DIGITAL MESSAGE INTERSPERSED THROUGHOUT A COMPRESSED INFORMATION SIGNAL

FIELD OF THE INVENTION

The present invention relates to telecommunications in general, and, more particularly, to transmitting a digital message along with an information signal.

BACKGROUND OF THE INVENTION

Modern telecommunications systems feature the routing of media information signals, such as audio or video, over one or more packet-based networks, such as the Internet. In Voice over Internet Protocol (or "VoIP"), for example, voice signals from the voice conversations to be routed are digitized and formatted into data packets, which are then transmitted through the network. A telecommunications network that is based on VoIP is able to transmit voice conversations between telecommunications endpoints that are able to access the network.

Each telecommunications endpoint, whether voice-capable or not, is a packet-based device that is capable of exchanging information with other devices; the endpoint exchanges information in a manner similar to how a personal computer is able to exchange information with other computers throughout the Internet. Consequently, the endpoint is vulnerable to many of the same or similar packet attacks as is a personal computer, such as "Denial-of-Service" (DoS) attacks. In fact, there are many sources of potential packet attacks that can be directed at an endpoint from within any of a variety of networks that are interconnected to the network used by the endpoint.

To improve the ability of the endpoint to withstand packet attacks, some type of authentication is necessary. Authentication enables the endpoint to decide which of the arriving packets are legitimate and which should be discarded. A standard protocol known as Secure Real-time Transport Protocol (SRTP) describes the procedures for performing one method of authentication. However, there is a drawback to this protocol. In order to authenticate a packet, it is necessary to compute a message digest over the header and the payload of the packet. This computation requires a significant amount of processing at the endpoint and can possibly overload the endpoint's processor.

Simpler schemes for authenticating each packet are available that require fewer processing resources. However, because of restrictions specified by SRTP and firewall behavior in the networks, it is typically not possible to append the additional information needed by the simpler schemes. Additionally, other applications unrelated to authentication can require the transmission of supplemental information, such as bits to convey additional control information for a particular feature. The problem is that unused bit positions in existing messages often do not exist and appended bits often cannot be transmitted, in order to convey the supplemental information.

What is needed is a technique to free up additional bit positions in each packet in a packet stream, for sending digital messages that contain supplemental information related to authentication or other purposes, without some of the disadvantages in the prior art.

SUMMARY OF THE INVENTION

The present invention enables the transmission of a digital message along with a corresponding media information signal, such as audio or video. In particular, a telecommunications device that is processing the information signal from its user, such as a speech signal, encodes the information signal by using a model-based compression coder. One such device is a telecommunications endpoint. Then, based on an evaluation of the perceptual significance of each encoded bit, or on some other meaningful characteristic of the signal, the endpoint's processor: (i) determines which encoded bits can be overwritten; and (ii) intersperses the digital message bits throughout the encoded signal in place of the overwritten bits. The endpoint then transmits the interspersed digital message bits as part of the encoded information signal. In this way, no additional bits are appended to the packet to be transmitted, thereby addressing the issue of compatibility with existing protocols and firewalls.

The technique of the illustrative embodiment differs from some techniques in the prior art in that the illustrative embodiment features bit-robbing in the context of a model-based compression coder, such as the one defined by the ITU G.729 set of protocol standards. In those techniques in the prior art, bit-robbing is only achieved in the context of a waveform coder, such as the one defined by the ITU G.711 protocol standard. In the prior art, bit-robbing in a waveform coder context can be as straightforward as: (i) recognizing that the least significant bits in a waveform-encoded signal are intuitively the least sensitive to degradation; and (ii) overwriting those least significant bits, where the overwritten bits are separated sufficiently in time along the waveform so as to minimize the degradation as perceived by a user.

In contrast, in a model-based coder context, a more careful selection of the bits to be overwritten is required, as it is not intuitively obvious which bits should be overwritten. The technique of the illustrative embodiment considers characteristics of the model-based coder, such as the perceptual significance of each bit across each frame generated by the coder, during the substitution of the targeted bits with the supplemental information to be transmitted. Advantageously, by a careful selection of the bits to be overwritten, the illustrative embodiment technique enables the transmission of a digital message without adding bits to the transmitted bit stream and with a minimal effect on perceived signal quality. Furthermore, the illustrative embodiment technique offers satisfactory performance while even in the presence of voice encoders of lower bit rates, such as those with encoded rates of 8 kilobits per second or less.

In accordance with the illustrative embodiment, the digital message that is interspersed throughout the encoded information signal comprises authentication code information that a receiving endpoint can use to authenticate the corresponding packet. Alternatively, the digital message can be used to convey other information along with the corresponding encoded information signal, such as closed-captioning information or geo-location information. Advantageously, each packet that comprises an encoded information signal and digital message provides an inherent form of synchronization between the media information having been encoded, such as an audio signal, and the supplemental information in the interspersed digital message, such as the corresponding closed caption for the audio signal.

The illustrative embodiment of the present invention comprises encoding a first audio signal, via a model-based audio coder, resulting in an encoded audio signal that is M bits in length; substituting N bits of the encoded audio signal with at least a portion of a digital message, wherein the N bits are based on a first characteristic of the model-based audio coder, the substitution of the N bits of the encoded audio signal providing a composite signal; and transmitting the composite signal to a receiving node; wherein M and N are positive integers and N is less than M.

DETAILED DESCRIPTION

Figure 1:
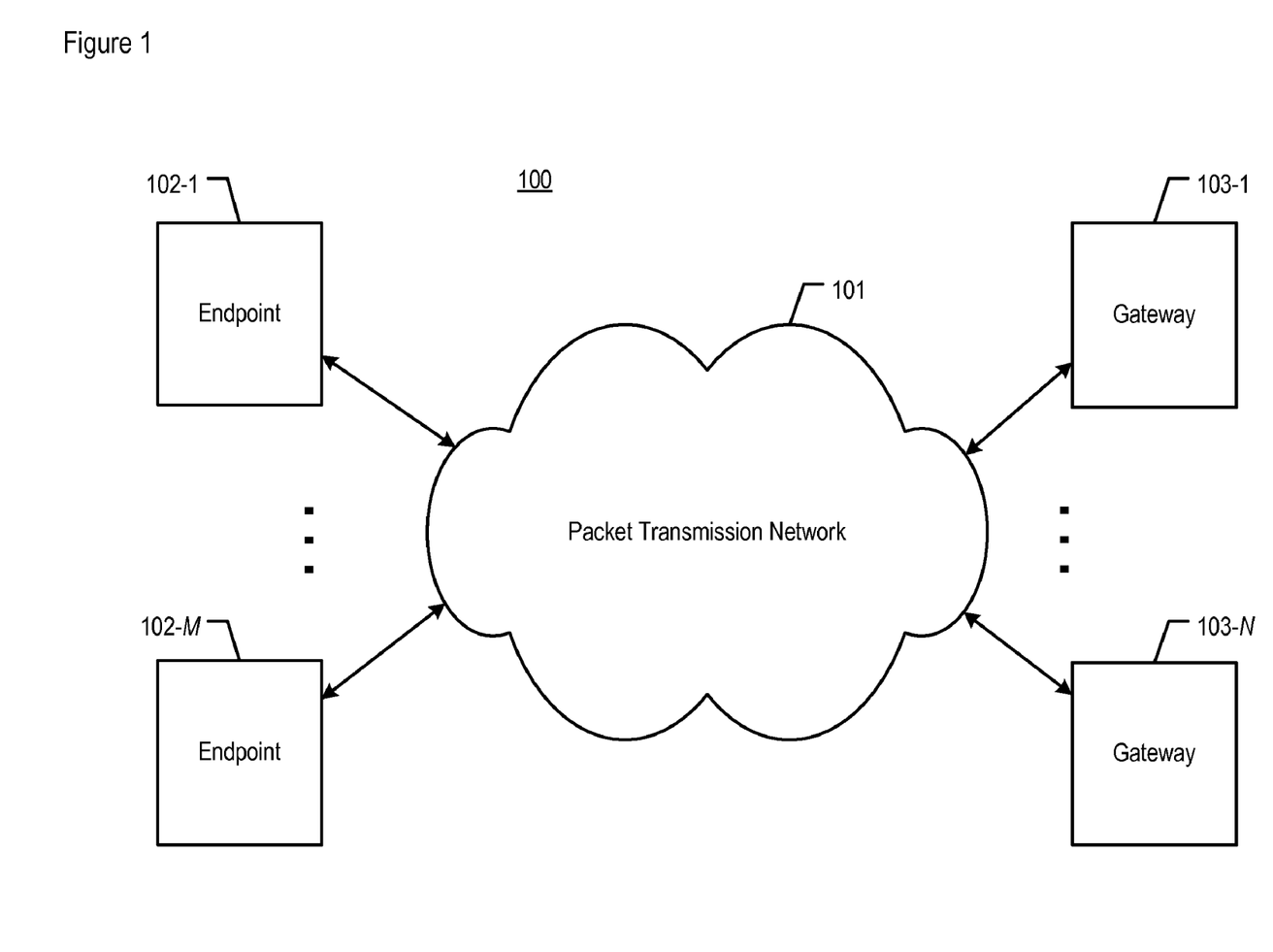
FIG. 1 depicts a schematic diagram of telecommunications system 100, in accordance with the illustrative embodiment of the present invention.

FIG. 1 depicts a schematic diagram of telecommunications system 100, in accordance with the illustrative embodiment of the present invention. System 100 routes voice conversations, or other types of media information signals such as video and other types of audio (e.g., music, etc.), between network elements such as telecommunications endpoints. System 100 comprises: packet transmission network 101; telecommunications endpoints 102-1 through 102-M; and gateways 103-1 through 103-N, wherein M and N are positive integers. All of the elements depicted in FIG. 1 are interconnected as shown.

Packet transmission network 101 is used to transport one or more types of media, such as Voice over Internet Protocol (or "VoIP"), for the subscribers of a service provider. Network 101 comprises one or more transmission-related nodes such as routers that are used to direct data packets that carry processed information signals (e.g., voice packets, etc.) from one or more sources to the correct destinations of those packets. Network 101 is capable of handling Internet Protocol-based messages that are transmitted among the network elements that have access to network 101, such as the various telecommunications endpoints and gateways throughout system 100. Although network 101 in the illustrative embodiment is a Voice-over-IP service provider's network, network 101 could alternatively be the Internet, some other type of Internet Protocol-based network, or some other type of packet-based network.

In some embodiments, network 101 comprises one or more local area networks (or "LAN"), which provide for the local distribution of signals, such as in an enterprise system. For example, each local area network can enable one or more telecommunications endpoints to access a wider network. Each local area network comprises networking equipment such as hubs, bridges, and switches, and operates in accordance with a networking protocol such as Ethernet, IEEE 802.3, IEEE 802.11, and so forth.

Telecommunications endpoint 102-$m$, for $m=1$ through M, is a communication appliance such as a deskset, a conferencing unit, a wireless terminal, a desktop or portable computer (i.e., "softphone"), an Internet phone, and so forth. As a packet-based device, telecommunications endpoint 102-$m$ is capable of exchanging information with other devices in telecommunications system 100, in a manner that is similar to how a personal computer is able to exchange information with other computers throughout the Internet.

Endpoint 102-$m$ is capable of digitizing voice signals from its user and formatting the digitized signals into transmittable data packets through an audio compressor/decompressor (or "CODEC") circuit, as described below and with respect to FIG. 2. Similarly, the CODEC circuit of endpoint 102-$m$ is also capable of receiving data packets and converting the information contained within those packets into voice signals that are understandable by the endpoint's user, as described below and respect to FIG. 3. Furthermore, endpoint 102-$m$ is capable of performing the tasks described below and with respect to FIGS. 4 and 5, in accordance with the illustrative embodiment of the present invention. It will be clear to those skilled in the art, after reading this specification, how to make and use endpoint 102-$m$.

Gateway 103-$n$, for $n=1$ through N, is a networking device that connects packet transmission network 101 with the network that is associated with a particular gateway (e.g., the Public Switched Telephone Network, etc.) by forwarding data packets between the two networks. Each gateway 103-$n$ acts as a translator between the two different types of networks to which it is connected (i.e., packet network 101 and another network). Because gateway 103-$n$ connects two different types of networks together, one of its main functions is to convert between the different transmission and coding techniques used across the two networks. Therefore, gateway 103-$n$ is also capable of converting between compressed and decompressed signals (e.g., via a "CODEC" circuit, etc.). In some embodiments, gateway 103-$n$ is capable of executing at least some of the tasks described below and with respect to FIGS. 4 and 5. It will be clear to those skilled in the art, after reading this specification, how to make and use gateway 103-$n$.

In accordance with the illustrative embodiment, the devices of system 100 are capable of wired communications and of operating in a service provider environment. As those who are skilled in the art will appreciate, in some alternative embodiments some or all of the devices of system 100 are capable of wireless communications, and of operating in various types of networks (e.g., public, private, etc.). Furthermore, in some alternative embodiments devices other than endpoints or gateways are capable of performing the tasks described below and with respect to FIGS. 4 and 5. It will be clear to those skilled in the art, after reading this specification, how to apply the techniques of the illustrative embodiment to other types of devices and in other operating environments.

Figure 2:
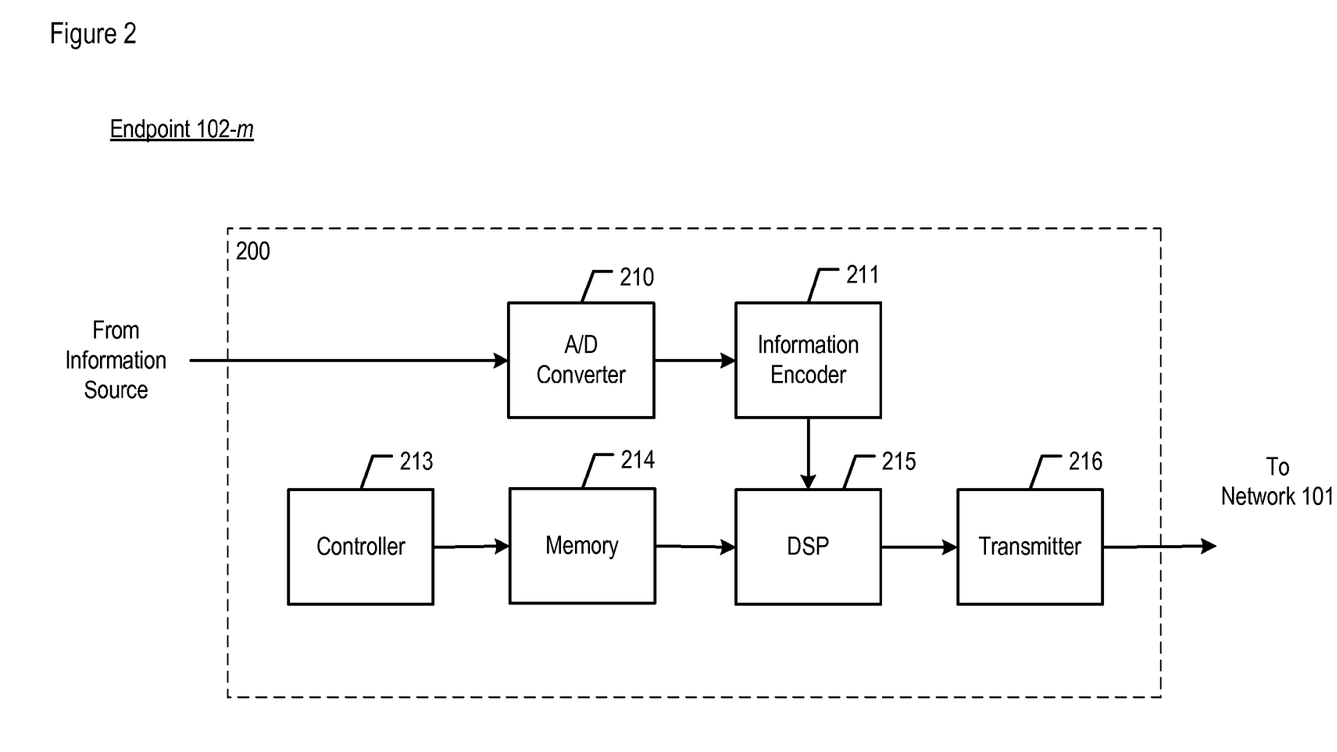
FIG. 2 depicts a block diagram of transmit processing path 200 of telecommunications endpoint 102-$m$, in accordance with the illustrative embodiment of the present invention.

FIG. 2 depicts a block diagram of transmit processing path 200 of telecommunications endpoint 102-$m$, in accordance with the illustrative embodiment of the present invention. Transmit path 200 processes an information signal, such as a voice signal from the endpoint's user, which can be acquired by a transducer such a microphone. If not already in digital form, analog-to-digital converter 210 converts the information signal from analog form to digital form.

After being digitized, information encoder 211 encodes the information signal to achieve data compression. In the illustrative embodiment, in which the information signal is a voice signal, encoder 211 comprises a vocoder, a type of CODEC known in the art, which performs the information compression. The vocoder takes the time-series waveform data and converts the data to digital symbols corresponding to speech pattern characteristics.

In accordance with the illustrative embodiment of the present invention, encoder 211 operates in accordance with the ITU G.729 protocol standard, as is known in the art. The ITU G.729 protocol standard is described in *ITU-T Recom-*

*mendation* G.729, "Coding of Speech at 8 Kbit/s using Conjugate-Structure Algebraic-Code-Excited Linear-Predication (CS-ACELP)," March 1996, as well as the corresponding Annexes (i.e., Annex A, Annex B, and so on), all of which are incorporated herein by reference. Encoder 211 is a model-based codec, which is different from waveform-based codecs such as those that are based on ITU G.711.

Concurrently, transmit controller 213 determines if a supplemental signal (e.g., for control purposes, etc.) needs to be transmitted along with the encoded information signal to the receiving node. For example, a supplemental signal might be an authentication code, which can be used by the receiving node to authenticate the packets that it receives. Controller 213 either acquires the supplemental signal from an outside source or generates the signal itself. When a supplemental signal needs to be transmitted, controller 213 writes to memory device 214 a digital message that represents the supplemental signal.

Digital signal processor 215 receives the compressed, encoded information signal from encoder 211 in the form of frames, and prepares the signal for transmission. Processor 215 also reads the digital message from memory 214 and substitutes a selected combination of bits in the encoded information signal with the bits from the digital message. In accordance with the illustrative embodiment, the combination of bits selected is based on prior analysis. In some alternative embodiments, processor 215 determines the combination of bits by evaluating data from the encoded information signal. In doing so, processor 215 determines which of the information signal bits can be substituted (i.e., overwritten) with bits received from controller 214 as described below, based on one or more characteristics of the encoder, such as the perceptual significance of each bit in the encoded information signal. The signal that results from the substitution is a composite signal that comprises the information signal and supplemental signal.

The supplemental bits from the digital message can be put into each frame such that each digital message spans multiple frames or fits within a single frame. In accordance with the illustrative embodiment, each portion of the digital message can be directly pertinent to the encoded information signal that the portion accompanies. Furthermore, each digital message portion can be merely time-coincident with its companion encoded information signal in a frame. Alternatively, the actual content of each digital message portion can correspond to the content of the companion information signal, such as where closed captioning is transmitted in the digital message that is in synch with the corresponding audio in the information signal.

Processor 215 performs other functions, such as coding the frame for forward error correction and formatting the frame for transmission. The composite signal is sent to transmitter 216, which then transmits the composite signal in well-known fashion to network 101.

Figure 3:
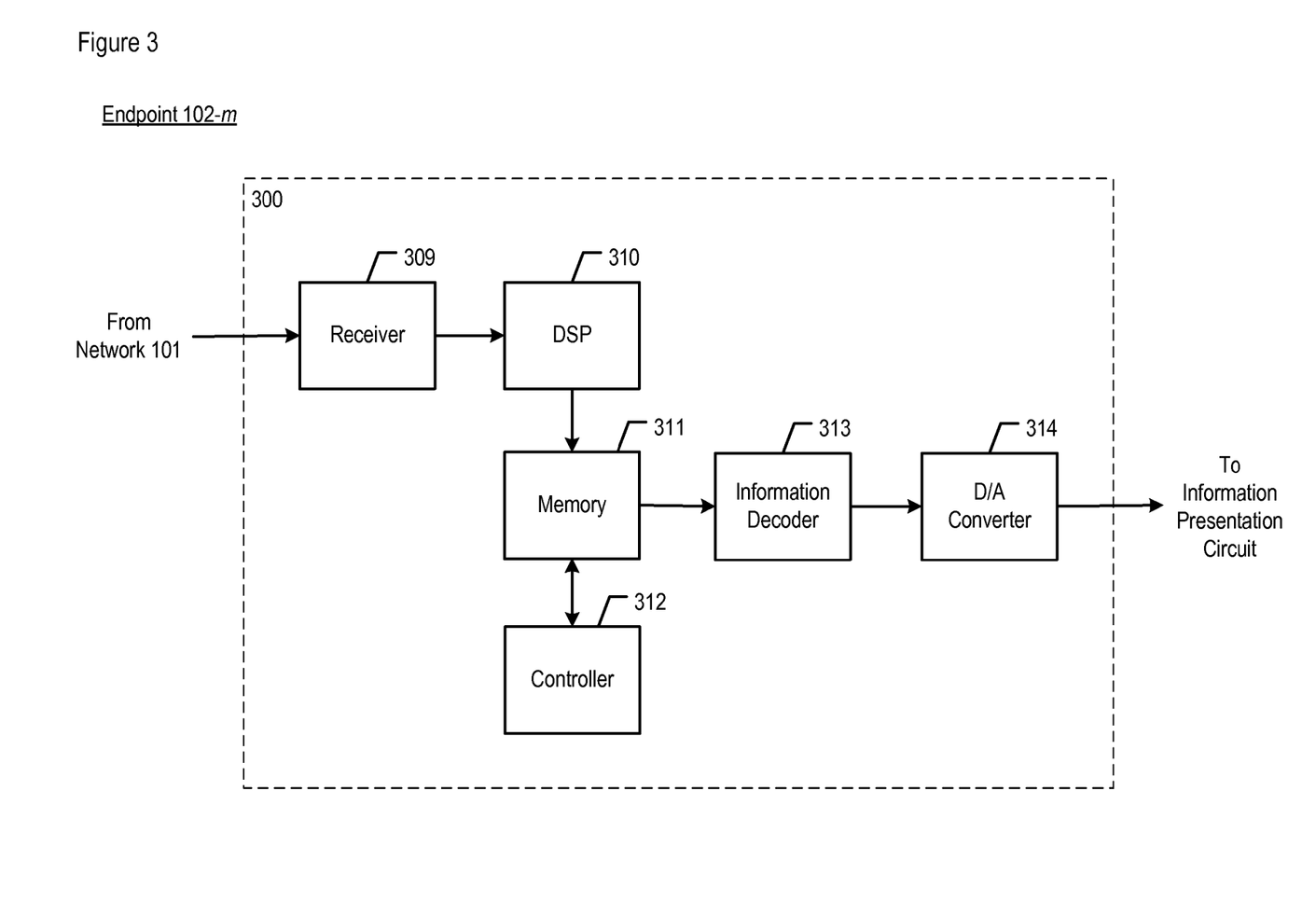
FIG. 3 depicts a block diagram of receive processing path 300 of telecommunications endpoint 102-$m$, in accordance with the illustrative embodiment of the present invention.

FIG. 3 depicts a block diagram of receive processing path 300 of telecommunications endpoint 102-*m*, in accordance with the illustrative embodiment of the present invention. Receive path 300 receives packets, each of which comprises one or more composite signal frames, from a transmitting endpoint or from another packet-capable device (e.g., gateway 103-*n*, etc.); path 300 then processes the received composite signal frames. In particular, receiver 309 receives the packet signals from network 101, in well-known fashion. Digital signal processor 310 detects and corrects errors, and then separates the supplemental bits from the encoded information bits in each received composite signal frame, and stores those bits into memory 311. Receive controller 312 accesses the supplemental bits as needed. For example, if the supplemental bits represent an authentication code, controller 312 uses the authentication code to determine the authenticity of the received encoded information signal.

Information decoder 313 decodes (decompresses) the encoded information signal to achieve a reconstructed version of the original information signal. In the illustrative embodiment, in which the information signal is a voice signal, decoder 313 comprises a vocoder, which is a type of CODEC known in the art and which performs the information decompression. The vocoder takes the digital data present in the received encoded information signal, which data correspond to speech pattern characteristics, and converts the data to time-series waveform data.

In accordance with the illustrative embodiment of the present invention, decoder 313 operates in accordance with the ITU G.729 protocol standard, as is known in the art. As with its counterpart encoder 211, decoder 313 is a model-based codec.

Continuing along receive path 300, digital-to-analog converter 314 converts the decoded information signal from digital form to analog form. Afterwards, the analog information signal can be additionally processed for eventual presentation to the receiving endpoint's user, such as by an acoustic speaker.

Figure 4:
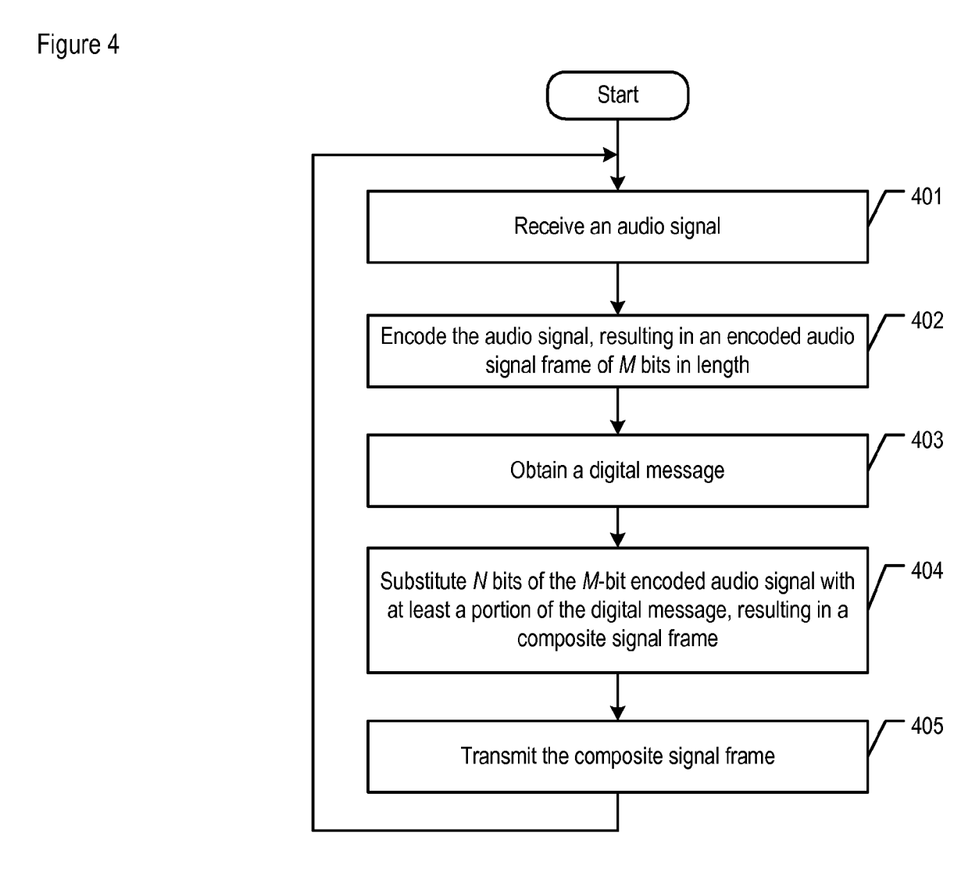
FIG. 4 depicts a flowchart of the salient tasks that pertain to the processing of an information signal along transmit processing path 200.
Figure 5:
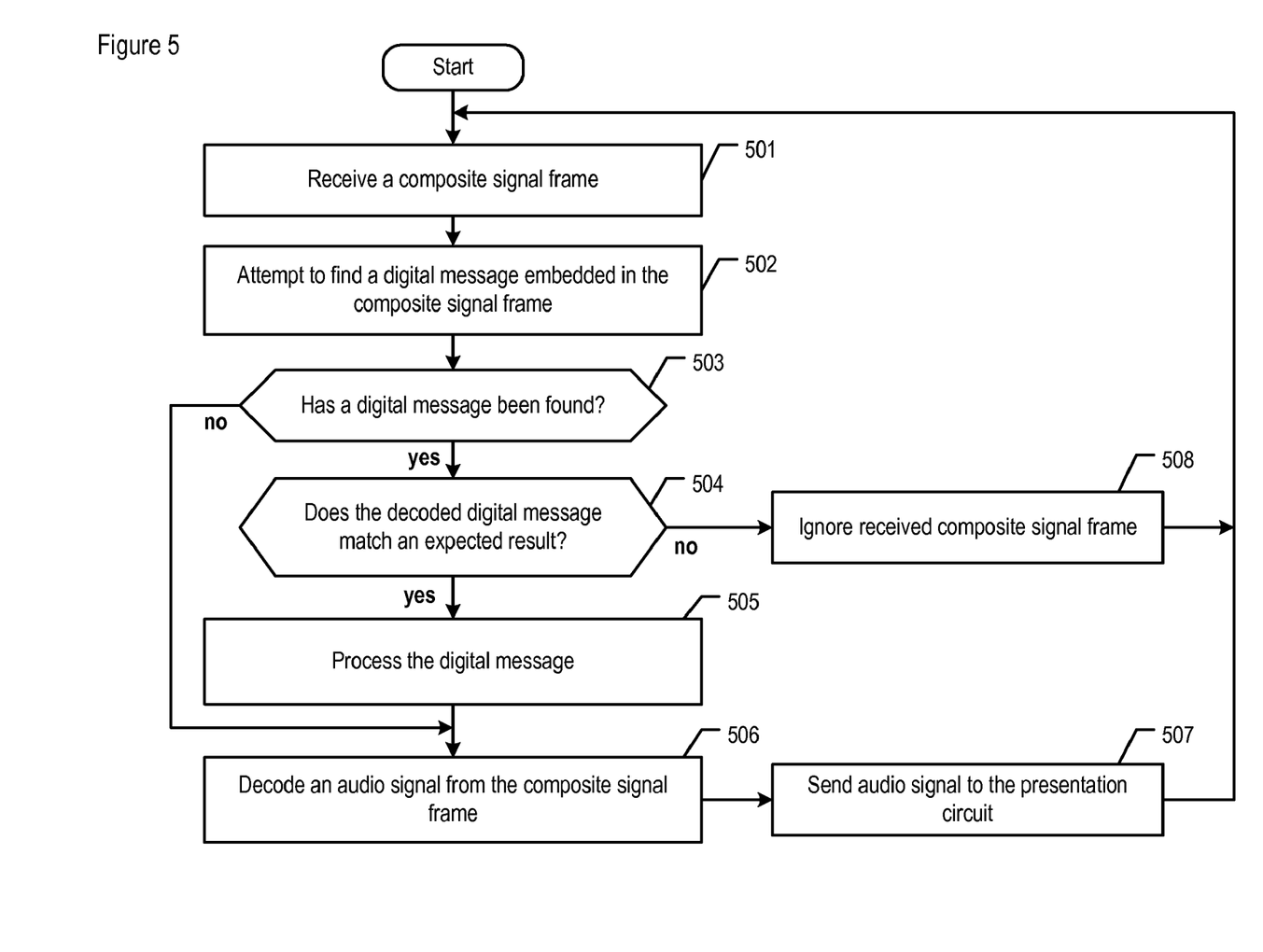
FIG. 5 depicts a flowchart of the salient tasks that pertain to the processing of an information signal along receive processing path 300.

FIGS. 4 and 5 depict flowcharts of the salient tasks that are executed by telecommunications endpoint 102-*m*, in accordance with the illustrative embodiment of the present invention. The salient tasks in FIG. 4 pertain to the processing of the information signal along transmit processing path 200 depicted in FIG. 2. The salient tasks in FIG. 5 pertain to the processing of the information signal along receive processing path 300 depicted in FIG. 3. For pedagogical purposes, the example that follows illustrates a call session that is in progress, in which endpoint 102-1 is sending a stream of audio packets to endpoint 102-2. In the example, transmitting endpoint 102-1 is performing the tasks with respect to FIG. 4; and receiving endpoint 102-2 is performing the tasks with respect to FIG. 5. Some of the tasks that appear in FIGS. 4 and 5 can be performed in parallel or in a different order than that depicted, as those who are skilled in the art will appreciate.

In some embodiments, as those who are skilled in the art will appreciate, endpoint 102-2 might be concurrently sending a stream of audio packets back to endpoint 102-1—in which case, endpoint 102-2 also performs the tasks with respect to FIG. 4 and endpoint 102-1 also performs the tasks with respect to FIG. 5. Alternatively, as those who are skilled in the art will also appreciate, other nodes in system 100 can perform the tasks depicted in FIGS. 4 and 5.

Referring to FIG. 4, transmit processing path 200 of endpoint 102-1 receives a segment of an audio signal in well-known fashion at task 401.

At task 402, transmit path 200 encodes the audio signal in accordance with the ITU G.729 protocol standard, providing an encoded audio signal frame that is M bits in length, wherein M is equal to 80 in this case.

At task 403, transmit path 200 obtains a digital message to be transmitted along with the audio signal. For example, controller 214 computes an authentication code based on a portion of the encoded audio signal frame, a shared key, and a hashing algorithm. Various other techniques for computing an authentication code are well-known in the art and can be applied here.

As a second example, the digital message is to contain closed-captioning information that is to coincide with the audio information signal also being sent. In this case, path 200 encodes closed-captioning text from the audio information signal, and provides synchronization information for the benefit of the receiving endpoint. In this way, the user at the receiving endpoint will see the closed-captioning text while the corresponding audio signal is played. Note that synchronization is inherent in the composite signal frame of the illustrative embodiment, in that the encoded information signal and the corresponding digital message can be represented in the same frame.

At task 404, in accordance with the illustrative embodiment, transmit path 200 substitutes N bits of the M-bit encoded audio signal with at least a portion of the digital message, resulting in a composite signal frame. An empirical study made in conjunction with the present invention shows that in each 80-bit frame of the encoded audio information signal received from encoder 211, processor 215 can substitute the bits at one or more of bit positions 39, 40, 68, 69, 30, and 41 with relatively low impact on the perceived audio quality; in the frame, the bits at bit positions 1 and 80 are the first and last bits, respectively, to be transmitted. As an example, processor 215 might substitute bit numbers 39, 40, 68, and 69 for a total of four bits in the frame (i.e., N is equal to four). As a second example, processor 215 might substitute bit numbers 39, 40, 68, 69, 30, and 41 for a total of six bits in the frame (i.e., N is equal to six).

In the bitstream ordering in the illustrative embodiment, bits 40 and 69 correspond to the least significant bits of the fixed-codebook index bits of the first and second subframes, respectively, within each 80-bit frame, in accordance with the ITU G.729 protocol standard. Furthermore, bits 39 and 68 correspond to the next least significant bits (i.e., are one bit position more significant than bits 40 and 69) of the fixed-codebook index bits of the first and second subframes, respectively. The concepts of the fixed-codebook index bits and the subframes that are generated are well-known in the art. As those who are skilled in the art will appreciate, after reading this specification, the bits that are substituted can be one or more of the least significant, fixed-codebook index bits of one or more subframes in each generated frame; this applies even if the model-based audio coder being used operates in accordance with a protocol standard other than ITU G.729.

At task 405, transmit path 200 transmits the composite signal frame to endpoint 102-2. After task 405, task execution proceeds back to task 401 to process the next frame's worth of audio signal.

Referring to FIG. 5, at task 501 receive processing path 300 of endpoint 102-2 receives the composite signal frame transmitted by endpoint 102-1.

At task 502, receive path 300 attempts to find a digital message embedded in the composite signal frame received from endpoint 102-1. In accordance with the illustrative embodiment, path 300 extracts a known pattern of bits—that is, based on the same combination of bits that were overwritten at task 404 by endpoint 102-1.

From endpoint 102-2's perspective, a transmitting endpoint might or might not have embedded a signal among the encoded information bits. In the illustrative embodiment, since there are no dedicated bits to indicate the presence of a digital message, or even to indicate the bit positions as to where a digital message might be if present, receive path 300 attempts to find a digital message by trying multiple combinations of bit positions and examining each combination of extracted bits to determine if a valid digital message is present. A digital message, for example, might be considered valid if information provided by transmitting endpoint 102-1 as part of the digital message, such as a checksum, is found to be correct.

At task 503, if a digital message was found to be present in the composite signal frame, task execution proceeds to task 504. Otherwise, no digital message is present, and task execution proceeds to task 506.

At task 504, receive path 300 then compares the digital message against an expected result. For example, if the digital message is being used as an authentication code, receive path 300 matches the received authentication code with a computed authentication code, where the computed code is based on the received encoded information bits, a shared key, and a hashing algorithm. If the digital message matches the expected result, task execution proceeds to task 505. Otherwise, task execution proceeds to task 508. In some alternative embodiments, the matching of the digital message against an expected result is not performed.

At task 505, receive path 300 further processes the digital message, if necessary. For example, the digital message might contain closed-captioning information that is to coincide with the playback of the audio information signal also being received. In this case, receive path 300 forms displayable closed-captioning text from the data received in the digital message, and then re-synchronizes the closed-captioning text that the user will see with the corresponding audio signal being played.

At task 506, receive path 300 decodes (i.e., reconstructs) an audio signal from the received composite signal frame. In some embodiments, if bits corresponding to a digital message are present in the composite signal frame, the values of some or all of those bits are modified to improve the results of the information decoding.

At task 507, receive path 300 sends the decoded audio signal to an audio circuit for additional processing, in well-known fashion. Task execution then proceeds back to task 501 to process the next frame received from endpoint 102-1.

At task 508, in the case of the digital message not having matched an expected result, receive path 300 ignores the received composite signal frame, in some embodiments. For example, if the digital message is being used for authenticating the received packet, the packet is discarded if the authentication process determines that the packet is not genuine. Task execution then proceeds back to task 501 to process the next frame received from endpoint 102-1.

As those who are skilled in the art will appreciate, multiple digital messages can be aggregated at receiving endpoint 102-2 and then used as a whole for a predetermined purpose.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of communicating a digital message with a first audio signal, the method comprising:
    encoding the first audio signal at a first telecommunications endpoint, via a model-based audio coder, resulting in an encoded audio signal having a frame that is M bits in length;
    calculating an authentication code dependent on at least a portion of the encoded audio signal, a shared key, and a hashing algorithm, resulting in the digital message comprising the authentication code;
    substituting a predetermined combination of N bits within the M-bit frame of the encoded audio signal with at least a portion of the digital message, wherein substituting the predetermined combination of N bits is based on a bit position, as encoded by the model-based audio coder, of each of the N bits within the M-bit frame of the encoded audio signal, and wherein the substitution of the N bits results in a composite signal; and transmitting the composite signal from the first telecommunications endpoint to a second telecommunications endpoint, thereby providing the authentication code to the second telecommunications endpoint in order to authenticate the composite signal;

wherein M and N are positive integers and N is less than M.

2. The method of claim 1 wherein the model-based audio coder operates in accordance with the ITU G.729 protocol standard.

3. The method of claim 2 wherein the predetermined combination of N bits comprises bit positions 40 and 69 in within the M-bit frame of the encoded audio signal, wherein M is equal to 80, and wherein the bit at bit position 1 is transmitted first in the frame.

4. The method of claim 3 wherein the predetermined combination of N bits further comprises bit positions 39 and 68 within the M-bit frame of the encoded audio signal, and wherein N is equal to 4.

5. The method of claim 1 wherein the predetermined combination of N bits is based on a level of perceptual significance of each of the N bits within the M-bit frame of the encoded audio signal, and wherein the model-based audio coder outputs bits according to multiple levels of perceptual significance.

6. The method of claim 1 wherein the ratio of N to M is based on an output rate of the model-based audio coder.

7. A method of communicating an authentication code with a first audio signal, the method comprising:

encoding the first audio signal at a first telecommunications endpoint, via a model-based audio coder that operates in accordance with the ITU G.729 protocol standard, resulting in an encoded audio signal having a frame that is M bits in length;

calculating the authentication code, wherein the authentication code is based on at least a portion of the encoded audio signal;

substituting a predetermined combination of N bits within the M-bit frame of the encoded audio signal with at least a portion of the authentication code, wherein substituting the predetermined combination of N bits is based on a bit position, as encoded by the model-based audio coder, of each of the N bits within the M-bit frame of the encoded audio signal, and wherein the substitution of the N bits results in a composite signal; and transmitting a packet that comprises the composite signal from the first telecommunications endpoint to a second telecommunications endpoint;

wherein the authentication code is for authenticating the packet at the second telecommunications endpoint; and wherein M and N are positive integers and N is less than M.

8. The method of claim 7 wherein the predetermined combination of N bits comprise bit positions 40 and 69 within the M-bit frame of the encoded audio signal, wherein M is equal to 80, and wherein the bit at bit position 1 is transmitted first in the frame.

9. The method of claim 8 wherein the predetermined combination of N bits further comprise bit positions 39 and 68 in the M-bit frame of the encoded audio signal, and wherein N is equal to 4.

10. The method of claim 7 wherein the N bits are based on a level of perceptual significance of each of the N bits within the the M-bit frame of the encoded audio signal.

11. The method of claim 7 wherein the authentication code is also based on a shared key.

12. The method of claim 7 wherein the authentication code is also based on a hashing algorithm.

13. A method of processing a composite signal received, the method comprising:

receiving, at a first telecommunications endpoint, an M-bit message frame comprising the composite signal, wherein a predetermined combination of N bits of the message frame is substituted with a digital message by a second telecommunications endpoint, the substitution being based on a bit position of each of the N bits within the message frame of an encoded audio signal that is encoded via a model-based audio coder, and wherein the composite signal comprises the encoded audio signal;

extracting, from the composite signal, the digital message found within the predetermined combination of N bits of the message frame;

comparing the digital message extracted to a computed authentication code;

when the digital message fails to match the computed authentication code, discarding the message frame; and when the digital message matches the computed authentication code, decoding i) bits at bit positions in the composite signal that correspond to the digital message and ii) bits at bit positions in the composite signal that do not correspond to the digital message, such that the decoding results in a reconstructed audio signal;

wherein M and N are positive integers and N is less than M.

14. The method of claim 13 wherein the computed authentication code is based on at least a portion of the encoded audio signal, a shared key, and a hashing algorithm.

15. The method of claim 13 wherein the decoding of the composite signal into a reconstructed audio signal comprises modifying some or all of the bits at bit positions in the composite signal that correspond to the digital message.

16. The method of claim 13 further comprising searching for the digital message, based on trying multiple combinations of bit positions including the predetermined combination of N bits that are used to extract the digital message from the message frame.

17. The method of claim 16 wherein the searching is also based on a checksum.

18. The method of claim 16 wherein the extracting of the digital message depends on a digital message having been found, and wherein when no digital message is found, decoding the composite signal.

* * * * *